(12) United States Patent
Nielsen

(10) Patent No.: US 8,851,341 B2
(45) Date of Patent: Oct. 7, 2014

(54) DISPENSING DEVICE FOR DISPENSING A POWDERED OR GRANULAR PRODUCT

(75) Inventor: Keld Krogh Nielsen, Graasten (DK)

(73) Assignee: Logidos ApS, Aabenraa (DK)

( * ) Notice: Subject to any disclaimer, the term of this patent is extended or adjusted under 35 U.S.C. 154(b) by 0 days.

(21) Appl. No.: 13/695,681

(22) PCT Filed: May 3, 2011

(86) PCT No.: PCT/DK2011/000040
§ 371 (c)(1),
(2), (4) Date: Nov. 1, 2012

(87) PCT Pub. No.: WO2011/137901
PCT Pub. Date: Nov. 10, 2011

(65) Prior Publication Data
US 2013/0062370 A1  Mar. 14, 2013

(30) Foreign Application Priority Data
May 5, 2010 (DK) .................................. 2010 00393

(51) Int. Cl.
| | |
|---|---|
| *G01F 11/26* | (2006.01) |
| *B28B 5/00* | (2006.01) |
| *B29C 45/00* | (2006.01) |
| *B65D 83/06* | (2006.01) |
| *B65D 47/08* | (2006.01) |
| *B65D 47/06* | (2006.01) |
| *B29L 31/00* | (2006.01) |
| *B29C 45/37* | (2006.01) |

(52) U.S. Cl.
CPC ........... *B65D 83/06* (2013.01); *B29L 2031/712* (2013.01); *G01F 11/261* (2013.01); *B29C 45/376* (2013.01); *B65D 47/08* (2013.01); *B29C 45/006* (2013.01); *B65D 47/06* (2013.01)
USPC ........... 222/455; 222/454; 222/442; 264/250; 264/328.1; 264/328.7

(58) Field of Classification Search
USPC .................. 222/455, 454, 456, 442; 264/250, 264/328.1, 328.7
See application file for complete search history.

(56) References Cited

U.S. PATENT DOCUMENTS

| | | | | |
|---|---|---|---|---|
| 1,962,562 A | * | 6/1934 | Hemman | 222/173 |
| 2,899,115 A | * | 8/1959 | Matters | 222/455 |

(Continued)

FOREIGN PATENT DOCUMENTS

| | | |
|---|---|---|
| EP | 1 923 676 A1 | 5/2008 |
| FR | 2 548 142 | 6/1983 |

(Continued)

OTHER PUBLICATIONS

PCT Search Report for PCT Serial No. PCT/DK2011/000039 dated Oct. 20, 2011.

(Continued)

*Primary Examiner* — Kevin P Shaver
*Assistant Examiner* — Nicholas J Weiss
(74) *Attorney, Agent, or Firm* — McCormick, Paulding & Huber LLP

(57) ABSTRACT

A dispensing device for dispensing powdered or granular product from a container containing said product comprises a first chamber and a second chamber. An inlet passage comprising at least one inlet opening and establishes communication between the first chamber and an interior part of a container having the dispensing device mounted thereon. An outlet passage adapted to deliver powdered or granular product being dispensed by means of the dispensing device establishes communication from the second chamber. An intermediate wall divides an interior part of the dispensing device into the first chamber and the second chamber, the intermediate wall defining an edge. The intermediate wall is arranged in such a manner that an intermediate passage between the first chamber and the second chamber is defined at the edge for allowing powdered or granular product to pass between the first chamber and the second chamber. The intermediate wall further defines a second passage.

13 Claims, 5 Drawing Sheets

(56) References Cited

U.S. PATENT DOCUMENTS

| | | | | |
|---|---|---|---|---|
| 4,061,253 A | * | 12/1977 | Rockefeller | 222/442 |
| 5,029,736 A | * | 7/1991 | Maruyama et al. | 222/455 |
| 5,148,953 A | * | 9/1992 | Fudalla | 222/442 |
| 5,480,071 A | * | 1/1996 | Santagiuliana | 222/455 |
| 5,495,964 A | * | 3/1996 | Santagiuliana | 222/455 |
| 7,032,788 B2 | * | 4/2006 | Moreau et al. | 222/455 |
| 2009/0159620 A1 | | 6/2009 | Nielsen | |
| 2013/0134191 A1 | | 5/2013 | Nielsen | |

FOREIGN PATENT DOCUMENTS

| | | |
|---|---|---|
| GB | 2 145 061 A | 3/1985 |
| WO | 93/16358 A1 | 8/1993 |
| WO | 94/10541 A1 | 11/1994 |
| WO | 2009/076959 A1 | 6/2009 |

OTHER PUBLICATIONS

PCT Search Report for PCT Serial No. PCT/DK2011/000040 dated Oct. 20, 2011.

* cited by examiner

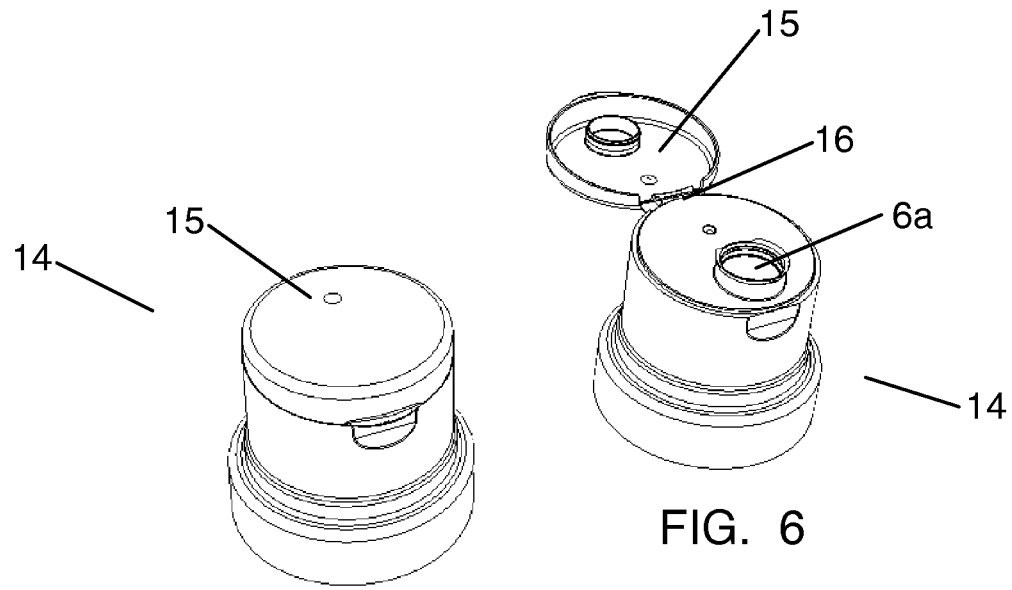
FIG. 5
FIG. 6
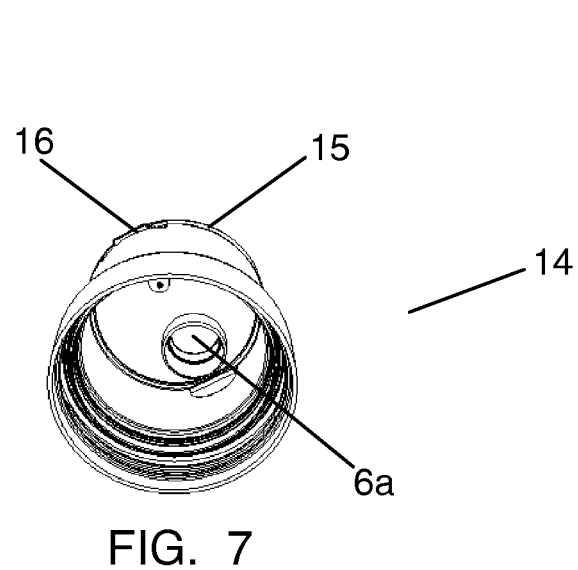
FIG. 7

DISPENSING DEVICE FOR DISPENSING A POWDERED OR GRANULAR PRODUCT

CROSS REFERENCE TO RELATED APPLICATIONS

This application is entitled to the benefit of and incorporates by reference essential subject matter disclosed in International Patent Application No. PCT/DK2011/000040 filed on May 3, 2011 and Danish Patent Application No. PA 2010 00393 filed May 5, 2010.

FIELD OF THE INVENTION

The present invention relates to a dispensing device for dispensing a powdered or granular product, such as ground coffee, freeze-dried instant coffee or tea, sugar or detergent powder from a container containing the powdered or granular product. More particularly, the present invention relates to a dispenser which is capable of delivering consistently precise doses of powdered or granular products.

BACKGROUND OF THE INVENTION

U.S. Pat. No. 5,480,071 discloses a measuring and dispensing device for granular or powdered products in which a tubular body is sleevable within the neck of the product container and is closed by a cap having a lid portion. The tubular body has a divider in the form of a diaphragm which defines a measuring chamber which communicates with the interior of the container and a collecting chamber which communicates with the measuring chamber and an outlet duct.

One disadvantage of the measuring and dispensing device of U.S. Pat. No. 5,480,071 is that during dispensing of the granular or powdered product an increased pressure may occur in the container, and the increased pressure may create turbulence in the container. Such turbulence may whirl up the powdered or granular product, and this may lead to errors in the dose of powdered or granular product being dispensed.

SUMMARY OF THE INVENTION

It is an object of embodiments of the invention to provide a dispensing device for dispensing powdered or granular product which is capable of dispensing doses of powdered or granular product in a more precise and reliable manner than prior art dispensing devices.

According to a first aspect the present invention provides a dispensing device for dispensing powdered or granular product from a container containing said product, the dispensing device comprising:
 a first chamber and a second chamber,
 an inlet passage comprising at least one inlet opening and establishing communication between the first chamber and an interior part of a container having the dispensing device mounted thereon,
 an outlet passage adapted to deliver powdered or granular product being dispensed by means of the dispensing device, said outlet passage establishing communication from the second chamber,
 an intermediate wall dividing an interior part of the dispensing device into the first chamber and the second chamber, the intermediate wall defining an edge, the intermediate wall being arranged in such a manner that an intermediate passage between the first chamber and the second chamber is defined at said edge for allowing powdered or granular product to pass between the first chamber and the second chamber, the intermediate wall further defining a second passage between the first chamber and the second chamber through the intermediate wall.

The dispensing device according to the invention is adapted to dispense powdered or granular products, such as ground coffee, freeze-dried instant coffee or tea, sugar, detergent powder, or any other suitable kind of powdered or granular product which it is desirable to dispense from a container containing the product. The dispensing device according to the invention is further capable of dispensing a metered dose of powdered or granular product. This will be explained further below.

The inlet passage establishes a fluid connection between the first chamber and an interior part of a container having the dispensing device mounted thereon. Thus, when the dispensing device is mounted on a container, powdered or granular product is allowed to pass from the interior of the container into the first chamber, and thereby into the dispensing device, via the inlet passage. Accordingly, when powdered or granular product is dispensed from the container by means of the dispensing device, powdered or granular product from the container first enters the dispensing device by entering the first chamber.

The outlet passage establishes communication from the second chamber, and it is adapted to deliver powdered or granular product being dispensed by means of the dispensing device. Accordingly, when powdered or granular product is dispensed by means of the dispensing device, it leaves the dispensing device from the second chamber and via the outlet passage.

The intermediate wall divides an interior part of the dispensing device into the first chamber and the second chamber. Accordingly, one surface of the intermediate wall faces the first chamber and another surface of the intermediate wall faces the second chamber. The intermediate wall may be solid in the sense that no cavities, channels or the like are defined inside the intermediate wall. In this case the intermediate wall is preferable thin, e.g. having a sheet-like structure. As an alternative, the intermediate wall may contain one or more hollow parts, e.g. in the form of one or more cavities and/or one or more channels.

The intermediate wall defines an edge, preferably in the form of a free end of the intermediate wall. The intermediate wall is arranged in the interior of the dispensing device in such a manner that an intermediate passage between the first chamber and the second chamber is defined at the edge. Accordingly, powdered or granular product which has entered into the first chamber from the container containing the powdered or granular product is allowed to pass into the second chamber, via the intermediate passage. Subsequently, the powdered or granular product can be delivered from the second chamber, via the outlet passage. In summary, powdered or granular product being dispensed by means of the dispensing device follows a path from the container, through the inlet passage into the first chamber, through the intermediate passage into the second chamber and out of the dispensing device via the outlet passage.

The intermediate wall further defines a second passage between the first chamber and the second chamber through the intermediate wall. The second passage allows air to move between the first chamber and the second chamber during dispensing of a dose of powdered or granular product. Thereby it is prevented that an increased pressure occurs inside the dispensing device and/or inside a container having the dispensing device mounted thereon. Accordingly, it is prevented that turbulence occurs, and that such turbulence causes the powdered or granular product to whirl up. As a consequence, the doses of powdered or granular product being dispensed by means of the dispensing device according to the invention are very precise and consistent in the sense that the size of the dose being dispensed is very reliable.

The dispensing device of the present invention may advantageously be operated in the following manner. The dispensing device is mounted at an opening of a container containing powdered or granular product to be dispensed by means of the dispensing device. Alternatively, the dispensing device may form an integral part of the opening of the container. The opening is normally arranged at a part of the container which is directed upwards when the container serves storage purposes only, i.e. when powdered or granular product is not being dispensed. Thus, in this situation the powdered or granular product in the container is not in contact with the opening, and thereby with the dispensing device.

When it is desired to dispense a dose of powdered or granular product from the container, the container is tipped, and the dispensing device is tipped along, in such a manner that the first chamber moves towards a position above the position of the second chamber. This tipping movement causes powdered or granular product from the container to enter the first chamber via the inlet passage. The container is then tipped back to an upright position. During this movement the powdered or granular product which has previously entered the first chamber is allowed to pass into the intermediate passage. The dispensing device may be designed in such a manner that the volume of the powdered or granular product trapped in the first chamber exceeds the volume of the intermediate passage. In this case excess powdered or granular product is preferably returned to the interior part of the container via the inlet passage when the container is tipped back to the upright position. As an alternative, the dispensing device may be designed in such a way that the volume of the first chamber is smaller than the volume of the intermediate passage. In this case the intermediate passage is not completely filled when powdered or granular product is passed from the first chamber to the intermediate passage. In any event, the amount of powdered or granular product contained in the intermediate passage constitutes a dose of powdered or granular product, and the size of the dose is defined by the smaller of the volume of the first chamber and the volume defined by the intermediate passage.

Subsequently the container, and thereby also the dispensing device, is once again tipped in such a manner that the first chamber moves towards a position above the position of the second chamber. Thereby the powdered or granular product contained in the intermediate passage moves into the second chamber, and onwards out of the dispensing device via the outlet passage. Simultaneously, a new amount of powdered or granular product enters the first chamber via the inlet opening as described above, and the dispensing device is thereby ready to deliver a dose of powdered or granular product the next time the container is tipped. Accordingly, each time the container is tipped as described above, a precise dose of powdered or granular product is dispensed from the container, the size of the dose being determined by the volumes of the first chamber and the intermediate passage as described above.

While a dose of powdered or granular product passes through the second chamber from the intermediate passage towards the outlet passage, air is allowed to move from the second chamber into the first chamber, via the second passage. Thereby it is prevented that an increased pressure is created in the second chamber, and turbulence in the second chamber as a result of such an increased pressure is thereby also avoided. Accordingly, the powdered or granular product is not whirled up, and a smooth flow of powdered or granular product is obtained, thereby allowing a very accurate dose of powdered or granular product to be dispensed.

The second passage through the intermediate wall may comprise a recess arranged along a surface of the intermediate wall facing the second chamber. According to this embodiment, air flowing from the second chamber into the first chamber via the second passage, flows in the recess, and is thereby guided towards the first chamber. Thereby it can be prevented that the second passage is blocked by powdered or granular product and prevents the desired pressure equalisation described above.

The recess may extend substantially along a flow direction of powdered or granular product being dispensed from the second chamber. According to this embodiment, the air flow flowing in the recess in the intermediate wall flows along a direction which is substantially opposite to or parallel with the flow direction of the powdered or granular product flowing towards the outlet passage in the second chamber. This makes it very easy for the air to flow towards the first chamber and provide the desired pressure equalisation.

As an alternative, the second passage may have any other suitable form, including simply a through-going hole formed in the intermediate wall.

The second passage through the intermediate wall may define an opening arranged at a position which is substantially opposite the edge of the intermediate wall. According to this embodiment, the air passes from the second chamber to the first chamber at a position which is substantially opposite the edge of the intermediate wall, and thereby substantially opposite the intermediate passage where the powdered or granular product enters the second chamber. Thus the powdered or granular product entering the second chamber via the intermediate passage may push air towards the second passage, thereby automatically providing the desired pressure equalisation.

The intermediate wall may be positioned in such a manner that at least a portion of the intermediate wall is inclined and/or curved towards the first chamber, and relatively to a longitudinal direction of the dispensing device. According to this embodiment, the intermediate wall and the first chamber in combination form a 'bowl shaped' part which can trap powdered or granular product in the first chamber during dispensing of a dose of powdered or granular product. This is because the inclination and/or the curvature of the intermediate wall ensures that when the dispensing device is tipped along with the container containing the powdered or granular product, at a certain point the edge of the intermediate wall is positioned higher than any other part of the intermediate wall. Thus, gravity prevents powdered or granular product from passing into the second chamber, via the intermediate passage, when this point is reached, and thereby the powdered or granular product is trapped inside the first chamber until the container and the dispensing device are returned to the upright position. This helps in ensuring that the dose dispensed by the dispensing device is precise.

The dispensing device may further comprise a first delimiting wall delimiting the second chamber towards an interior part of a container having the dispensing device mounted thereon, and a second delimiting wall delimiting at least the first chamber, the second delimiting wall being arranged substantially opposite the first delimiting wall. The first delimiting wall prevents powdered or granular product from passing directly from the container into the second chamber. Thus, the only passage into the dispensing device is the inlet passage, leading into the first chamber. Similarly, the second delimiting wall delimits the first chamber, thereby preventing that powdered or granular product can leave the first chamber in any other way than through the intermediate passage. Thus, the powdered or granular product is forced to follow the strict flow path through the dispensing device which is described above. Thereby the dose being delivered by the dispensing device can be controlled precisely.

The dispensing device may comprise a first part and a second part, wherein the intermediate wall forms part of the first part and the second delimiting wall forms part of the second part. Forming the dispensing device from two separate parts makes it easier to manufacture the dispensing device by means of injection moulding, because it is thereby possible to mould the interior parts, such as the intermediate wall, directly along with the dispensing device. This is very advantageous, since injection moulding is an easy and cost efficient manufacturing method. Furthermore, one of the parts may be sized and shaped in such a manner that it fits with several other parts. Thereby it is possible to manufacture various dispensing devices, e.g. delivering various doses of powdered or granular product, using the same manufacturing tools. For instance, the first part may be an insert part adapted to be inserted into the container, e.g. into a bottle neck, and the second part may be a top part adapted to be arranged primarily outside the container.

The first delimiting wall may be in the form of a separate part mounted onto the dispensing device. According to this embodiment, it is also possible to manufacture the dispensing device by means of injection moulding, since the first delimiting wall does not have to be moulded along with the rest of the dispensing device. Thereby it is possible to mould the interior parts of the dispensing device directly along with the rest of the dispensing device. Furthermore, the position of the first delimiting wall may in some cases define the volume of the dispensed dose. Thus, when the first delimiting wall is manufactured separately and mounted onto the dispensing device, the size of the dispensing device may be adjusted in order to obtain a desired dose, prior to mounting the first delimiting wall. This makes it possible to manufacture dispensing devices adapted to deliver various doses of powdered or granular product, using the same manufacturing equipment. This allows the manufacturer to offer a variety of different dispensing devices at minimal manufacturing costs.

The first delimiting wall may be mounted onto the dispensing device by means of any suitable technique, such as welding, gluing, heat treatment, etc., depending of the material of the dispensing device.

The dispensing device may further comprise at least one dividing wall arranged to divide the inlet passage into at least two separate portions. According to this embodiment, the flow of powdered or granular product into the first chamber, via the inlet passage, is divided into two or more flows. This helps in providing a smooth flow of powdered or granular product, and in preventing that the powdered or granular product is whirled up during the dispensing of the powdered or granular product.

The dividing wall may further provide stiffness to the construction, thereby ensuring that the dispensing device can be arranged in a substantially fluid tight manner in an opening of a container containing powdered or granular product.

The present invention further relates to a container for containing a powdered or granular product, the container having a dispensing device according to the first aspect of the invention mounted thereon. The dispensing device may either be a separate part which is mounted onto the container, or it may form an integral part of the container.

According to a second aspect the invention provides a method for manufacturing a dispensing device according to the first aspect of the invention, the method comprising the step of injection moulding at least a part of the dispensing device.

It should be noted that a person skilled in the art would readily recognise that any feature described in combination with the first aspect of the invention could also be combined with the second aspect of the invention, and vice versa.

The method may further comprise the step of mounting a first delimiting wall on the dispensing device. As described above, this makes it easy to directly form the interior parts of the dispensing device, such as the intermediate wall, by means of injection moulding. Furthermore, the position of the first delimiting wall may determine the dose being delivered by the dispensing device, and mounting the first delimiting wall separately may therefore allow for an adjustment of the dose to be delivered by the dispensing device. The first delimiting wall may be mounted using any suitable technique, such as welding, gluing or heat treatment.

The method may comprise the steps of:
injection moulding a first part of the dispensing device in such a manner that an intermediate wall is formed,
injection moulding a second part of the dispensing device in such a manner that a second delimiting wall is formed, and
assembling the first part and the second part.

As described above, this allows various dispensing devices to be manufactured using the same moulding equipment.

The method may further comprise the steps of:
selecting a dosage to be dispensed by the resulting dispensing device,
calculating at least one dimension of the dispensing device in such a manner that said dimension(s) provide(s) the selected dosage,
adjusting injection moulding equipment in accordance with the calculated dimension(s), and
injection moulding at least a part of the dispensing device using the adjusted injection moulding equipment.

According to this embodiment, dispensing devices adapted to deliver various doses of powdered or granular product can be manufactured using the same moulding equipment.

The at least one dimension(s) may include a distance between the edge of the intermediate wall and the position of a first delimiting wall. This distance may define the amount of powdered or granular product it is possible to store in the intermediate passage, and thereby the dose being dispensed by the dispensing device. Accordingly, the dose delivered by the resulting dispensing device may be adjusted merely by adjusting a single parameter, e.g. a length of the dispensing device. Afterwards, a first delimiting wall may be mounted as described above.

As an alternative, the dispensing devices may be injection moulded with equal lengths, and the length may subsequently be adjusted by removing material before a first delimiting wall is mounted. However, during this process material is wasted. Furthermore, it may be difficult to remove the excess material in a manner which provides a smooth edge for mounting the first delimiting wall.

BRIEF DESCRIPTION OF THE DRAWINGS

The invention will now be described in further detail with reference to the accompanying drawings in which FIG. 5-7 are perspective views of a second part of a dispensing device according to an embodiment of the invention, seen from three different angles.

DETAILED DESCRIPTION

Figure 1:
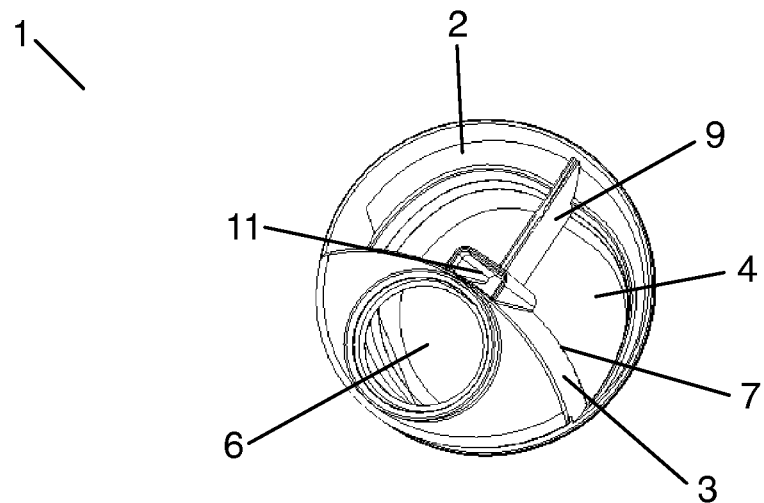
FIGS. 1-4 are perspective views of a first part of a dispensing device according to an embodiment of the invention, seen from four different angles.
Figure 2:
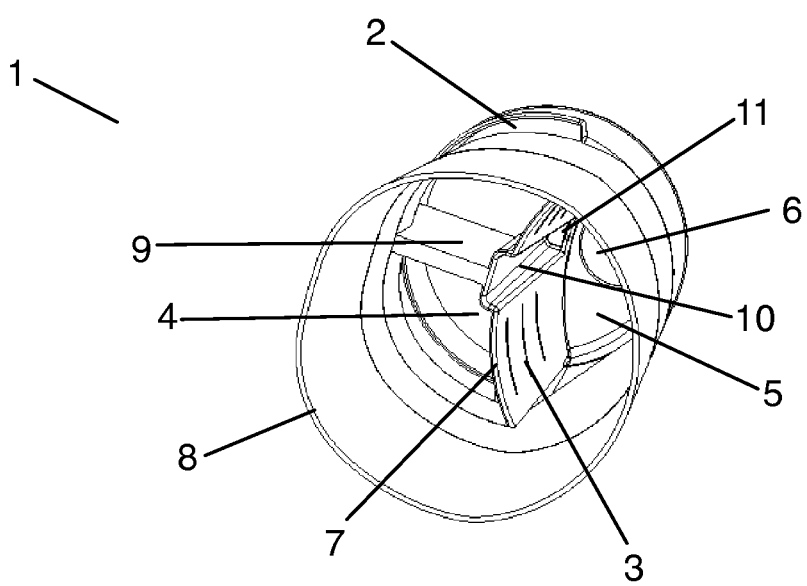
Figure 3:
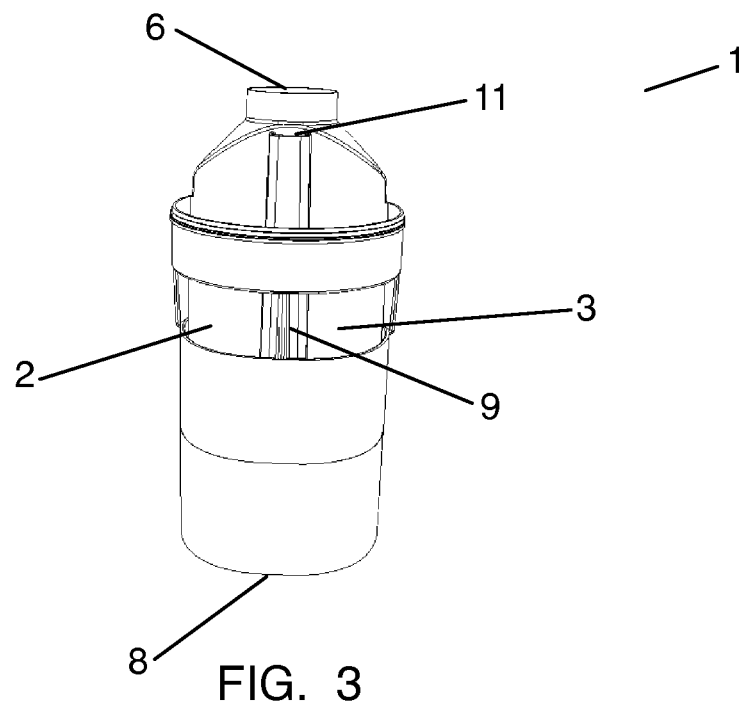
Figure 4:
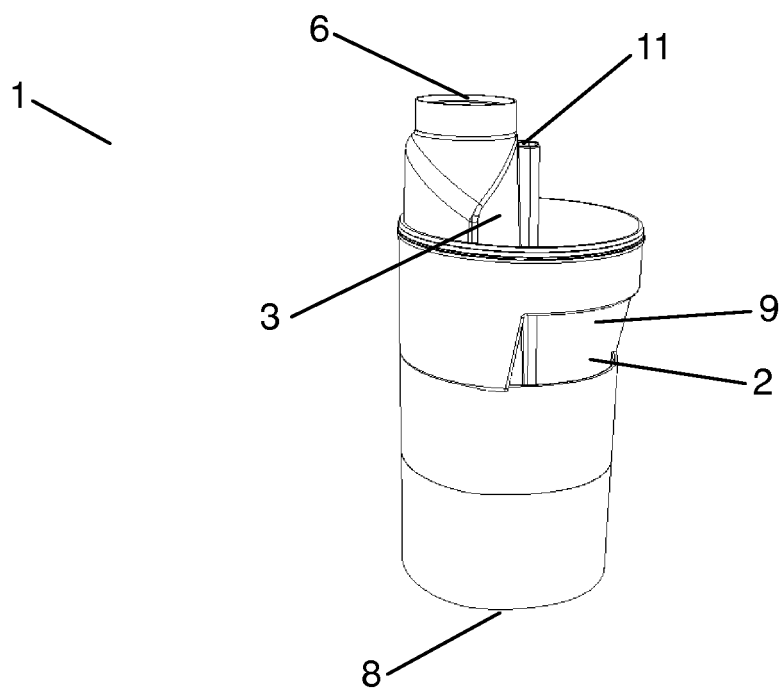

FIGS. 1-4 are perspective views of a first part 1 of a dispensing device according to an embodiment of the invention, seen from four different angles. FIG. 1 is a top view of the first part 1, FIG. 2 is a view from below, FIG. 3 is a side view through an inlet passage 2, and FIG. 4 is a side view substantially perpendicular to the view of FIG. 3.

An intermediate wall 3 is arranged in the interior parts of the first part 1, dividing the interior of the first part 1 into a first chamber 4 and a second chamber 5. The second chamber 5 is fluidly connected to an outlet passage 6 adapted to deliver powdered or granular product being dispensed by the dispensing device. The first chamber 4 communicates with the inlet passage 2. When the dispensing device is mounted on a container containing powdered or granular product, the inlet passage 2 furthermore communicates with the interior of the container. Thereby powdered or granular product from the container is allowed to enter the first chamber 4 via the inlet passage 2.

The intermediate wall 3 defines an edge 7 which is arranged at a distance from a lower rim 8 of the first part 1. Thereby an intermediate passage is defined between the edge 7 and the lower rim 8, the intermediate passage allowing powdered or granular product to pass from the first chamber 4 to the second chamber 5 during dispensing of powdered or granular product.

During storage, i.e. when a dose of powdered or granular product is not being dispensed by the dispenser, the dispenser is normally orientated in such a manner that the outlet passage 6 faces upwards.

When it is desired to dispense a dose of powdered or granular product, the dispensing device is tipped in a direction which moves the first chamber 4 towards a position above the second chamber 5. Thereby powdered or granular product enters the first chamber 4 via the inlet passage 2. During this, the flow of powdered or granular product is 'broken' by dividing wall 9. This helps in providing a smooth flow of powdered or granular product through the inlet passage 2, and in preventing that the powdered or granular product is whirled up while entering the first chamber 4.

Then the dispensing device is once again moved to the upright position, i.e. to the position where the outlet passage 6 is facing upwards. Thereby the powdered or granular product which has previously entered the first chamber 4 moves towards the intermediate passage defined at the edge 7 of the intermediate wall 3, and thereby enters the second chamber 5.

Next, the dispensing device is once again tipped in the manner described above. This causes the powdered or granular product which has entered into the second chamber 5 to move towards the outlet passage 6, and the powdered or granular product is thereby dispensed from the dispensing device, via the outlet passage 6. Simultaneously, a new dose of powdered or granular product enters the first chamber 4 via the inlet passage 2 as described above, and the dispensing device is thereby immediately ready for dispensing a new dose of powdered or granular product. As the powdered or granular product flows in the second chamber 5 towards the outlet passage 6, air is moved via recess 10 towards through-going hole 11 and into the first chamber 4. Thereby it is prevented that an increased pressure builds up in the second chamber 5. This prevents turbulence in the second chamber 5, and it is thereby prevented that the powdered or granular product whirls up during dispensing of powdered or granular product. It is thereby ensured that the dose of powdered or granular product being dispensed by the dispensing device is precise and consistent.

The volume of the dose of powdered or granular product being dispensed is determined by a combination of the volume defined by the first chamber 4, i.e. the amount of powdered or granular product which the first chamber 4 holds when the dispensing device is initially tipped, and the volume defined by the intermediate passage, i.e. the amount of powdered or granular product which can be contained between the edge 7 of the intermediate wall 3 and the lower rim 8 of the first part 1. Accordingly, it is possible, at least to some extent, to adjust the dose of powdered or granular product to be dispensed by the dispensing device by adjusting the length of the dispensing device, i.e. by adjusting the position of the lower rim 8. This may, e.g., be done by removing material, i.e. shortening the first part 1, or by adjusting the manufacturing tool used for manufacturing the first part 1 in a manner which adjusts the length of the first part 1 to match the desired dose.

FIGS. 5-7 are perspective views of a second part 14 of a dispensing device according to an embodiment of the invention. The second part 14 of FIGS. 5-7 may advantageously be assembled with the first part 1 shown in FIGS. 1-4, thereby forming a dispensing device.

The second part 14 is provided with a lid 15 which is connected to the remaining part of the second part 14 by means of a hinge 16. An outlet passage 6a may be arranged in fluid communication with outlet passage 6 of the first part 1 of FIGS. 1-4, thereby allowing powdered of granular product to be dispensed through the second part 14. The lid 15 may be in an open position, as shown in FIG. 6, allowing powdered or granular product to be delivered, or in a closed position, as shown in FIGS. 5 and 7, preventing powdered or granular product from being delivered.

Figure 8:
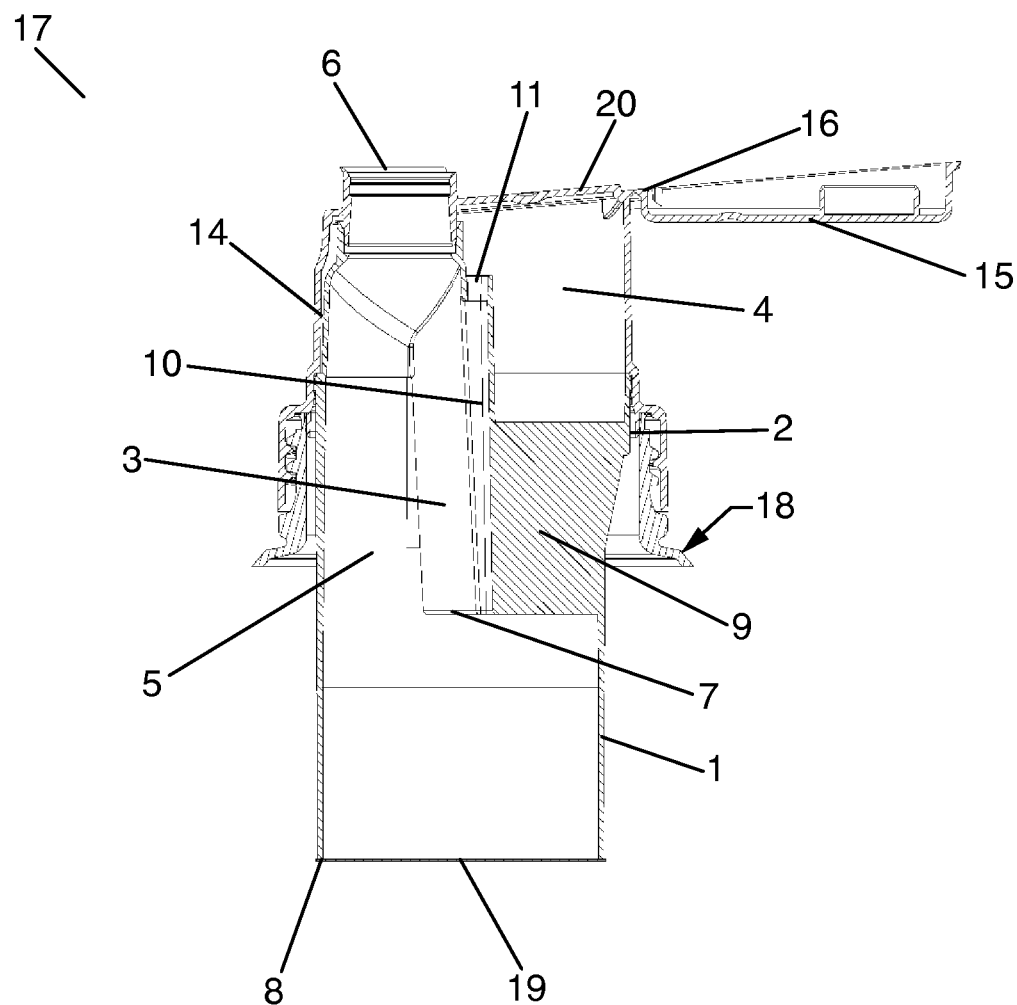
FIG. 8 is a cross sectional view of a dispensing device according to an embodiment of the invention, the dispensing device comprising the first part of FIGS. 1-4 and the second part of FIGS. 5-7.

FIG. 8 is a cross sectional view of a dispensing device 17 comprising the first part 1 of FIGS. 1-4 and the second part 14 of FIGS. 5-7. The dispensing device 17 is mounted on a bottle neck 18, the bottle containing powdered or granular product to be dispensed.

A first delimiting wall 19 has been mounted on the lower rim 8 of the first part 1, the first delimiting wall 19 delimiting the second chamber 5 towards the interior parts of the container. A second delimiting wall 20 is defined by the second part 14, the second delimiting wall 20 delimiting the first chamber 4 towards the exterior of the dispensing device 17.

Figure 9:
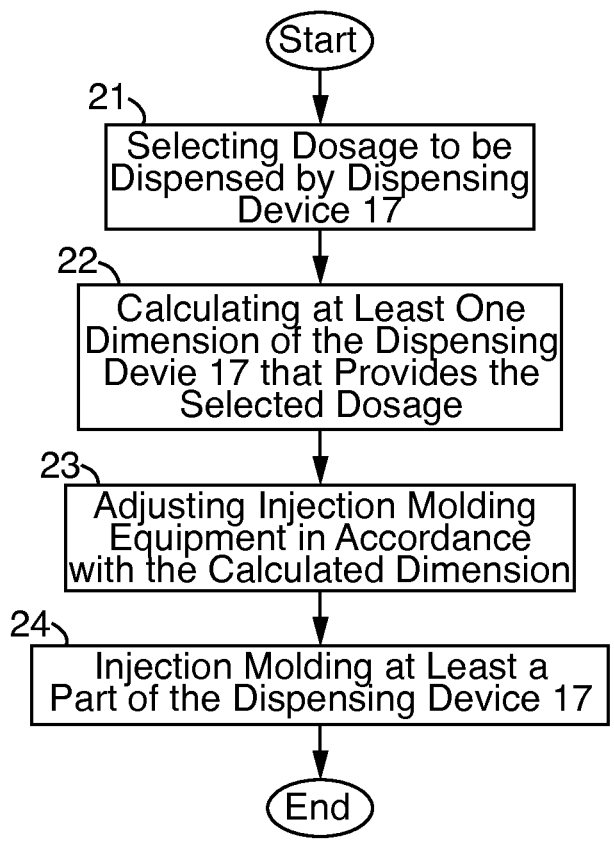
FIG. 9 is a flow diagram of a method for manufacturing at least a part of the dispensing device of FIG. 8 according to an embodiment.

Referring to FIG. 9, a method for manufacturing at least a part of the dispensing device 17 is shown. The method comprises selecting a dosage to be dispensed by the resulting dispensing device 17 at step 21. At step 22, the method includes calculating at least one dimension of the dispensing device 17 in such a manner that said dimension(s) provide(s) the selected dosage. The method further comprises adjusting injection moulding equipment in accordance with the calculated dimension(s) at step 23 and injection moulding at least a part of the dispensing device 17 using the adjusted injection moulding equipment at step 24. Accordingly, as discussed above, it is possible, at least to some extent, to adjust the dose of powdered or granular product to be dispensed by the dispensing device 17 by adjusting the length of the dispensing device, i.e. by adjusting the position of the lower rim 8, shown in FIG. 8. This may, e.g., be done by removing material, i.e. shortening the first part 1, shown in FIG. 8, or by adjusting the manufacturing tool used for manufacturing the first part 1, shown in FIG. 8, in a manner which adjusts the length of the first part 1, shown in FIG. 8, to match the desired dose.

Although various embodiments of the present invention have been described and shown, the invention is not restricted thereto, but may also be embodied in other ways within the scope of the subject-matter defined in the following claims.

What is claimed is:

1. A dispensing device for dispensing powdered or granular product from a container containing said product, the dispensing device comprising:
    a first chamber and a second chamber,
    an inlet passage comprising at least one inlet opening and establishing communication between the first chamber and an interior part of a container having the dispensing device mounted thereon,
    an outlet passage adapted to deliver powdered or granular product from the dispensing device, said outlet passage establishing communication from the second chamber, and
    an intermediate wall dividing an interior part of the dispensing device into the first chamber and the second chamber, the intermediate wall defining an edge, the intermediate wall being arranged in such a manner that an intermediate passage between the first chamber and the second chamber is defined at said edge for allowing powdered or granular product to pass between the first chamber and the second chamber, the intermediate wall further defining a second passage between the first chamber and the second chamber through the intermediate wall,
    wherein the second passage through the intermediate wall defines an opening arranged at a position which is substantially opposite the edge of the intermediate wall, and
    wherein the second passage through the intermediate wall comprises a recess arranged along a surface of the intermediate wall facing the second chamber.

2. The dispensing device according to claim 1, wherein the recess extends substantially along a flow direction of powdered or granular product being dispensed from the second chamber.

3. The dispensing device according to claim 1, wherein the intermediate wall is positioned in such a manner that at least a portion of the intermediate wall is inclined and/or curved towards the first chamber, and relative to a longitudinal direction of the dispensing device.

4. The dispensing device according to claim 1, further comprising a first delimiting wall delimiting the second chamber towards an interior part of a container having the dispensing device mounted thereon, and a second delimiting wall delimiting at least the first chamber, the second delimiting wall being arranged substantially opposite the first delimiting wall.

5. The dispensing device according to claim 4, the dispensing device comprising a first part and a second part, wherein the intermediate wall forms part of the first part and the second delimiting wall forms part of the second part.

6. The dispensing device according to claim 4, wherein the first delimiting wall is in the form of a separate part mounted onto the dispensing device.

7. The dispensing device according to claim 1, further comprising at least one dividing wall arranged to divide the inlet passage into at least two separate portions.

8. A container for containing a powdered or granular product, the container having a dispensing device according to claim 1 mounted thereon.

9. A method for manufacturing a dispensing device according to claim 1, the method comprising the step of injection molding at least a part of the dispensing device.

10. The method according to claim 9, further comprising the step of mounting a first delimiting wall on the dispensing device.

11. The method according to claim 9, the method comprising the steps of:
    injection molding a first part of the dispensing device in such a manner that an intermediate wall is formed,
    injection molding a second part of the dispensing device in such a manner that a second delimiting wall is formed, and
    assembling the first part and the second part.

12. The method according to claim 9, further comprising the steps of:
    selecting a dosage to be dispensed by the resulting dispensing device,
    calculating at least one dimension of the dispensing device in such a manner that said dimension(s) provide(s) the selected dosage,
    adjusting injection molding equipment in accordance with the calculated dimension(s), and
    injection molding at least a part of the dispensing device using the adjusted injection moulding equipment.

13. The method according to claim 12, wherein the at least one dimension(s) includes a distance between the edge of the intermediate wall and the position of a first delimiting wall.

* * * * *